United States Patent
Tosato et al.

(10) Patent No.: US 12,489,504 B2
(45) Date of Patent: Dec. 2, 2025

(54) UPLINK CONTROL INFORMATION

(71) Applicant: Nokia Technologies Oy, Espoo (FI)

(72) Inventors: Filippo Tosato, Bures sur Yvette (FR); Marco Maso, Issy les Moulineaux (FR); Nhat-Quang Nhan, Reims (FR); Hao Liu, Pudong (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 18/545,259

(22) Filed: Dec. 19, 2023

(65) Prior Publication Data

US 2024/0137090 A1   Apr. 25, 2024

Related U.S. Application Data

(63) Continuation of application No. 17/730,915, filed on Apr. 27, 2022, now Pat. No. 11,909,484, which is a
(Continued)

(30) Foreign Application Priority Data

Apr. 4, 2019   (WO) ................ PCT/CN2019/081612

(51) Int. Cl.
*H04B 7/06* (2006.01)
*H04B 7/0456* (2017.01)
(Continued)

(52) U.S. Cl.
CPC ......... *H04B 7/0634* (2013.01); *H04B 7/0481* (2023.05); *H04B 7/0639* (2013.01);
(Continued)

(58) Field of Classification Search
CPC .. H04B 7/0626; H04B 7/0632; H04B 7/0634; H04B 7/0639; H04B 7/068; H04L 1/16;
(Continued)

(56) References Cited

U.S. PATENT DOCUMENTS

| 8,488,725 B2 | 7/2013 | Yuan et al. |
| 10,069,550 B2 | 9/2018 | Jeong et al. |

(Continued)

FOREIGN PATENT DOCUMENTS

| CN | 101341669 B | 1/2009 |
| CN | 101400074 A | 4/2009 |

(Continued)

OTHER PUBLICATIONS

3GPP TS 38.214 V15.5.0, 3rd Generation Partnership Project; Technical Specification Group Radio Access Network; NR; Physical Layer Procedures for data (Release 15) (Year: 2019).*

(Continued)

*Primary Examiner* — Andrew W Chriss
(74) *Attorney, Agent, or Firm* — ALSTON & BIRD LLP

(57) ABSTRACT

Embodiments of the present disclosure relate to methods, devices, apparatuses and computer readable storage media for Uplink Control Information (UCI) design. The method comprises determining, at a terminal device, a matrix comprising a set of non-zero linear combination coefficients for quantizing a channel between the terminal device and a network device, the matrix having spatial components and frequency components; shifting the frequency components of the matrix circularly, such that a target coefficient of the set of non-zero linear combination coefficients is located in a frequency component with a predetermined index of the frequency components in a shifted matrix; generating a first indication indicating the spatial component associated with the target coefficient in the matrix; and transmitting, to the network device, uplink control information comprising the first indication. In this way, a new solution for designing the UCI may reduce the overhead for reporting the parameters in the UCI.

30 Claims, 5 Drawing Sheets

Related U.S. Application Data continuation of application No. 17/067,076, filed on Oct. 9, 2020, now Pat. No. 11,336,356, which is a continuation of application No. 16/838,300, filed on Apr. 2, 2020, now Pat. No. 10,848,229.

(51) Int. Cl.
  *H04L 1/1607* (2023.01)
  *H04W 72/21* (2023.01)
  *H04W 72/23* (2023.01)

(52) U.S. Cl.
  CPC ........... *H04L 1/1614* (2013.01); *H04W 72/21* (2023.01); *H04W 72/23* (2023.01)

(58) Field of Classification Search
  CPC ... H04L 1/1607; H04L 1/1614; H04L 1/1671; H04W 72/04; H04W 72/0406; H04W 72/0413; H04W 72/042; H04W 72/044; H04W 72/0453; H04W 72/046
  See application file for complete search history.

(56) References Cited

U.S. PATENT DOCUMENTS

| | | | |
|---|---|---|---|
| 10,686,502 B1 | 6/2020 | Zhao et al. | |
| 11,336,356 B2 | 5/2022 | Tosato et al. | |
| 2009/0016463 A1 | 1/2009 | Roh | |
| 2012/0076028 A1 | 3/2012 | Ko et al. | |
| 2012/0300867 A1* | 11/2012 | Chen | H04B 7/0456 375/267 |
| 2012/0314590 A1 | 12/2012 | Choudhury et al. | |
| 2014/0105319 A1 | 4/2014 | Lee et al. | |
| 2016/0142117 A1 | 5/2016 | Rahman et al. | |
| 2016/0156397 A1 | 6/2016 | Onggosanusi et al. | |
| 2016/0254882 A1 | 9/2016 | Lee et al. | |
| 2016/0359538 A1* | 12/2016 | Onggosanusi | H04B 7/0478 |
| 2017/0141928 A1 | 5/2017 | Androulaki et al. | |
| 2017/0302353 A1 | 10/2017 | Rahman et al. | |
| 2017/0331531 A1 | 11/2017 | Wu | |
| 2017/0331541 A1 | 11/2017 | Kang et al. | |
| 2018/0145737 A1* | 5/2018 | Rahman | H04B 7/0634 |
| 2019/0334587 A1 | 10/2019 | Rahman et al. | |
| 2020/0028555 A1* | 1/2020 | Rahman | H04W 80/08 |
| 2020/0083937 A1 | 3/2020 | Rahman et al. | |
| 2020/0162142 A1* | 5/2020 | Rahman | H04B 7/0639 |
| 2020/0186224 A1 | 6/2020 | Ahmed Salem et al. | |
| 2020/0220598 A1 | 7/2020 | Zhang et al. | |
| 2020/0235790 A1 | 7/2020 | Rahman et al. | |
| 2020/0313744 A1* | 10/2020 | Hindy | H04B 7/063 |
| 2020/0322012 A1 | 10/2020 | Wernersson et al. | |
| 2020/0322028 A1 | 10/2020 | Tosato et al. | |
| 2021/0028846 A1 | 1/2021 | Tosato et al. | |
| 2021/0143874 A1* | 5/2021 | Park | H04B 7/0486 |
| 2021/0226674 A1 | 7/2021 | Ramireddy et al. | |
| 2022/0006500 A1 | 1/2022 | Wei et al. | |
| 2022/0085856 A1 | 3/2022 | Shi et al. | |
| 2022/0116093 A1* | 4/2022 | Liu | H04B 7/0626 |

FOREIGN PATENT DOCUMENTS

| | | | | |
|---|---|---|---|---|
| CN | 101771505 A | | 7/2010 | |
| CN | 103220083 A | | 7/2013 | |
| CN | 108352875 A | | 7/2018 | |
| EP | 2485408 A1 | * | 8/2012 | ........... H04B 7/0626 |
| EP | 2992705 A2 | | 3/2016 | |
| EP | 2996258 A1 | | 3/2016 | |
| EP | 2485408 B1 | * | 6/2017 | ........... H04B 7/0626 |
| EP | 3477874 A1 | | 5/2019 | |
| EP | 3672099 A1 | | 6/2020 | |
| EP | 3734853 A1 | | 11/2020 | |
| EP | 3910807 A1 | | 11/2021 | |
| EP | 3920429 A1 | | 12/2021 | |
| RU | 2569319 C2 | | 11/2015 | |
| WO | WO-2011122919 A2 | * | 10/2011 | ........... H04B 7/0417 |
| WO | WO-2011137595 A1 | * | 11/2011 | ............. H04B 7/063 |
| WO | WO 2014/126992 | | 8/2014 | |
| WO | WO 2018/044116 A1 | | 3/2018 | |
| WO | WO 2018/097600 A1 | | 5/2018 | |
| WO | WO-2020173402 A1 | * | 9/2020 | ......... H04B 7/06952 |
| WO | WO-2020182269 A1 | * | 9/2020 | ......... H04B 7/06956 |
| WO | WO-2020200711 A1 | * | 10/2020 | ........... H04B 7/0481 |
| WO | WO 2022/153251 A1 | | 7/2022 | |
| WO | WO-2022194822 A1 | * | 9/2022 | ........... H04B 7/0417 |

OTHER PUBLICATIONS

"3rd Generation Partnership Project; Technical Specification Group Radio Access Network; NR; Physical Layer Procedures for Data (Release 15)", 3GPP TS 38.214 v15.5.0 (Mar. 2019), 103 pages.

"5G; NR; Physical layer procedures for data (3GPP TS 38.214 version 15.3.0 Release 15)", ETSI TS 138 214 v15.3.0, (Oct. 2018), 99 pages.

"CSI Enhancements for MU-MIMO", 3GPP TSG RAN WG1 Ad-Hoc Meeting #AH1901, R1-1900690, Agenda : 7.2.8.1, Nokia, Jan. 21-25, 2019, 17 pages.

"Discussion on CSI Enhancement", 3GPP TSG-RAN WG1 meeting #96bis, R1-1903969, Agenda: 7.2.8.1, Huawei, Apr. 8-12, 2019, 19 pages.

"Enhancements on CSI Reporting and Codebook Design", 3GPP TSG RAN WG1 Meeting #94, R1-1808949, Agenda : 1.2.8, Huawei, Aug. 20-24, 2018, 7 pages.

"On the Necessity of Feeding Back Oversampling Index for Type II CSI Enhancements", 3GPP TSG RAN WG1 Meeting RAN1#96-bis, R1-1905115, Agenda : 7.2.8.6, Ericsson, Apr. 8-12, 2019, 3 pages.

"On UCI Reporting of SCI and FD Basis", 3GPP TSG RAN WG1 Meeting #97, R1-1907319, Agenda : 7.2.8.5, Nokia, May 13-17, 2019, 4 pages.

"Quantization Bit for Codebook Enhancement", 3GPP TSG RAN WG 1 Meeting #95, R1-1813693, Agenda : 7.2.8.6, Fluawei, Nov. 12-16, 2018, 4 pages.

"Summary of CSI enhancement for MU-MIMO", 3GPP TSG RAN WG1 96, R1-1902304, Agenda : 7.2.8.1, Samsung, Feb. 25-Mar. 1, 2019, 16 pages.

Decision to Grant for Japanese Application No. 2021-558860 dated Oct. 5, 2023, 4 pages.

Decision to Grant for Russian Application No. 2021126440 dated Jun. 8, 2022, 15 pages.

Examination Report for Australian Application No. 2023202461 dated Nov. 30, 2023, 2 pages.

Extended European Search Report received for corresponding European Patent Application No. 20166658.3, dated Aug. 25, 2020, 14 pages.

First Examination Report for Indian Application No. 202127048881 dated Aug. 17, 2022, 6 pages.

Intel Corporation, "On NR Type I Codebook", 3GPP TSG RAN WG1 #88, R1-1702205, (Feb. 13-17, 2017), 6 pages.

International Search Report and Written Opinion received for corresponding Patent Cooperation Treaty Application No. PCT/CN2019/081612, dated Dec. 31, 2019, 9 pages.

LG Electronics, "Feedback Codebook Enhancement and Performance Evaluation", 3GPP TSG RAN WG1 Meeting #62, R1-104768, (Aug. 23-28, 2010), 9 pages.

Nokia et al., "CSI Overhead Reduction for Type II Codebook Up To Rank 2", 3GPP TSG RAN WG1 Meeting #96, R1-1902562, (Feb. 24-Mar. 1, 2019), 17 pages.

Nokia et al., "On Overhead Reduction for W2 Rank-2 Codebook in Advanced CSI", 3GPP TSG RAN WG1 Meeting #88, R1-1702294, (Feb. 13-17, 2017), 9 pages.

Nokia et al., "On Phase Rotations and FD Compression", 3GPP TSG RAN WG1 Meeting #96, R1-1902568, (Feb. 24-Mar. 1, 2019), 3 pages.

Non-Final Office Action for U.S. Appl. No. 17/067,076 dated Aug. 4, 2021.

Non-Final Office Action for U.S. Appl. No. 17/730,915 dated Dec. 16, 2022.

(56) References Cited

OTHER PUBLICATIONS

Notice of Acceptance for Australian Application No. 2019438745 dated Jan. 23, 2023, 3 pages.
Notice of Acceptance for Chilean Application No. 202102351 dated Jul. 10, 2023, 2 pages.
Notice of Acceptance for Mexico Application No. MX/a/2021/012144 dated Jun. 6, 2022, 6 pages.
Notice of Allowance for Chinese Application No. 201980095125.8 dated Jun. 13, 2023, 4 pages.
Notice of Allowance for Korean Application No. 10-2021-7028615 dated Mar. 14, 2023, 3 pages.
Notice of Allowance for Korean Application No. 10-2023-7019866 dated Jul. 10, 2023, 4 pages.
Notice of Allowance for Taiwanese Application No. 109111341 dated Jan. 27, 2022, 3 pages.
Notice of Allowance for U.S. Appl. No. 17/067,076 dated Jan. 13, 2022.
Notice of Allowance for U.S. Appl. No. 17/067,076 dated Nov. 2, 2021.
Notice of Allowance received for corresponding U.S. Appl. No. 16/838,300, dated Aug. 10, 2020,11 pages.
Notice of Grant for Colombian Application No. NC2021/0014882 dated Dec. 21, 2022, 14 pages.
Office Action for ARIPO Application No. AP/P/2021/013479 dated Aug. 8, 2023, 4 pages.
Office Action for Australian Application No. 2019438745 dated Aug. 25, 2022, 2 pages.
Office Action for Canadian Application No. 3,134,720 dated Nov. 9, 2022, 6 pages.
Office Action for Chilean Application No. 202102351 dated Feb. 15, 2023, 42 pages.
Office Action for Chilean Application No. 202102351 dated Oct. 11, 2022, 24 pages.
Office Action for Chinese Application No. 201980095125.8 dated Oct. 11, 2022, 4 pages.
Office Action for Japanese Application No. 2021-558860 dated May 11, 2023, 4 pages.
Office Action for Japanese Application No. 2021-558860 dated Nov. 14, 2022, 10 pages.
Office Action for Korean Application No. 10-2021-7028615 dated Jan. 9, 2023, 6 pages.
Office Action for Korean Application No. 10-2023-7034529 dated Nov. 16, 2023, 5 pages.
Office Action for Russian Application No. 2021126440 dated Feb. 14, 2022, 7 pages.
Office Action for Taiwan Application No. 109111341 dated Dec. 21, 2020, 12 pages.
Samsung, "CSI Enhancement for MU-MIMO", 3GPP TSG RAN WG1 Meeting #96, R1-1903359, (Feb. 25-Mar. 1, 2019), 10 pages.
Samsung, "Feature lead summary for MU-MIMO CSI—revision on selected issues", 3GPP TSG RAN WG1 96bis, R1-1905629, (Apr. 12-16, 2019), 17 pages.
Samsung, "Feature Lead Summary for MU-MIMO CSI", 3GPP TSG RAN WG1 96bis, R1-1904448, (Apr. 12-16, 2019), 17 pages.
Supplemental Extended European Search Report for European Application No. 19922583.0 dated Oct. 10, 2022, 10 pages.
Decision to Grant for ARIPO Application No. AP/P/2021/013479 dated Dec. 1, 2023, 5 pages.
Notice of Allowance for Korean Application No. 10-2023-7034529 dated Jan. 19, 2024, 4 pages.
Office Action for Canadian Application No. 3,134,720 dated Jan. 26, 2024, 4 pages.
Office Action for Egyptian Application No. 1561/2921 dated Oct. 22, 2023, 8 pages.
Office Action for Saudi Arabian Application No. 521430493 dated Dec. 17, 2023, 10 pages.
Office Action for Singapore Application No. 11202110126Y dated Mar. 27, 2024, 7 pages.
Intention to Grant for European Application No. 19922583.0 dated Oct. 11, 2024, 42 pages.
MCC Support, "Final Report of 3GPP Tsg Ran WG1 #96b v1.0.0", 3GPP Tsg Ran WG1 Meeting #97, R1-1905921, (May 13-17, 2019), 159 pages.
Notice of Acceptance for South African Application No. 2021/08305 dated May 23, 2024, 2 pages.
Notice of Grant for Saudi Arabian Application No. 521430493 dated Sep. 12, 2024, 2 pages.
Office Action for Brazilian Application No. BR112021019626-9 dated Aug. 13, 2024, 8 pages.
Office Action for Chinese Application No. 202311080527.5 dated Apr. 30, 2024, 7 pages.
Office Action for Indonesian Application No. P00202109550 dated Sep. 24, 2024, 6 pages.
Office Action for Korean Application No. 10-2024-7013025 dated Jun. 12, 2024, 7 pages.
Qin et al., "A Review of Codebooks for CSI Feedback in 5G New Radio and Beyond", arXiv:2302.09222v2, (Jun. 13, 2023), 11 pages.
Samsung, "Summary of CSI enhancement for MU-MIMO support", 3GPP TSG RAN WG1 Meeting #95, R1-1813002, (Nov. 12-16, 2018), 9 pages.
Notice for Eligibility of Grant for Singapore Application No. 11202110126Y dated Apr. 1, 2025, 4 pages.
Notice of Acceptance for Australian Application No. 20230202461 dated Nov. 8, 2024, 3 pages.
Notice of Acceptance for South African Application No. 2024/00667 dated Mar. 17, 2025, 2 pages.
Notice of Allowance for Korean Application No. 10-2024-7013025 dated Nov. 25, 2024, 3 pages.
Office Action for Chinese Application No. 202311080527.5 dated Nov. 29, 2024, 8 pages.
Notice of Allowance for Korean Application No. 10-20247013025 dated Aug. 14, 2024, 4 pages.
Decision to Grant for Chinese Application No. 202311080527.5 dated Jun. 30, 2025, 4 pages.
Extended European Search Report for European Application No. 25156320.1 dated May 21, 2025, 8 pages.
Office Action for Malaysian Application No. PI2021005884 dated Jun. 5, 2025, 6 pages.

* cited by examiner

UPLINK CONTROL INFORMATION

CROSS-REFERENCE TO RELATED APPLICATIONS

The present application is a continuation of U.S. Non-Provisional patent application Ser. No. 17/730,915, filed on Apr. 27, 2022 and entitled "Uplink Control Information," which is a continuation of U.S. Non-Provisional patent application Ser. No. 17/067,076, filed on Oct. 9, 2020 and entitled "Uplink Control Information," which is a continuation of U.S. Non-Provisional patent application Ser. No. 16/838,300, filed on Apr. 2, 2020 and entitled "Uplink Control Information," which claims the benefit of priority to International Patent Application Serial No. PCT/CN2019/081612, filed Apr. 4, 2019 and entitled "Uplink Control Information," the entire disclosures of each of which are hereby incorporated herein by reference in their entireties for all purposes.

FIELD

Embodiments of the present disclosure generally relate to the field of telecommunication and in particular, to methods, devices, apparatuses and computer readable storage media for Uplink Control Information (UCI) design.

BACKGROUND

In 3GPP New Radio (NR) Rel-15 and 16, a compression mechanism has been introduced to reduce the overhead in reporting Channel State Information (CSI) from UEs to the Base Transceiver Station (BTS), which is required to operate Multi-User Multiple Input Multiple Output (MU-MIMO) in the downlink. The mechanism consists in two DFT-based operations in the spatial domain and in the frequency domain. These operations are applied to each layer for rank indicators (RI) from 1 to 4. The CSI message may comprise a Channel Quality Indicator (CQI) and a Precoding Matrix Indicator (PMI). The CQI may be obtained from an estimate of the expected SINR after decoding of a codeword multiplexed across the reported spatial layers and PMI may comprise a set of complex-valued precoding weights that are needed to achieve that CQI. Both CQI and PMI parameters are reported per sub-band. The PMI is represented by a matrix for each reported layer, each containing as many column vectors as the number of sub-bands. The SD and FD compression operations are applied to these PMI matrices across their rows and columns respectively.

An important aspect of CSI signaling for MU-MIMO is the arrangement of the components of the compressed PMI in uplink control information (UCI) message. In a conventional way, this message may be organized in two parts, namely "UCI part 1" and "UCI part 2". The "UCI part 1" may comprise the CQI information and the parameters needed to determine the payload size of the "UCI part 2". The "UCI part 1" transmitted in the Physical Uplink Control Channel (PUCCH) may have a very short and fixed-size payload and may be encoded with very strong forward error correction code to guarantee error-free decoding. The "UCI part 2" may comprise the bulk of compressed PMI and be transmitted in the Physical Uplink Shared Channel (PUSCH), hence it has the same error protection as data.

SUMMARY

In general, example embodiments of the present disclosure provide a solution for Uplink Control Information (UCI) design.

In a first aspect, there is provided a method. The method comprises determining, at a terminal device, a matrix comprising a set of non-zero linear combination coefficients for quantizing a channel between the terminal device and a network device, the matrix having spatial components and frequency components; shifting the frequency components of the matrix circularly, such that a target coefficient of the set of non-zero linear combination coefficients is located in a frequency component with a predetermined index of the frequency components in a shifted matrix; generating a first indication indicating the spatial component associated with the target coefficient in the matrix; and transmitting, to the network device, uplink control information comprising the first indication.

In a second aspect, there is provided a method. The method comprises receiving, at a network device and from a terminal device, uplink control information comprising a first indication, the first indication indicating spatial components associated with a target coefficient in a matrix comprising a set of non-zero linear combination coefficients for quantizing a channel between the terminal device and the network device, the matrix having the spatial components and frequency components; and determining state information of the channel based on the uplink control information.

In a third aspect, there is provided a device. The device comprises at least one processor; and at least one memory including computer program codes; the at least one memory and the computer program codes are configured to, with the at least one processor, cause the device at least to determine, at a terminal device, a matrix comprising a set of non-zero linear combination coefficients for quantizing a channel between the terminal device and a network device, the matrix having spatial components and frequency components; shift the frequency components of the matrix circularly, such that a target coefficient of the set of non-zero linear combination coefficients is located in a frequency component with a predetermined index of the frequency components in a shifted matrix; generate a first indication indicating the spatial component associated with the target coefficient in the matrix; and transmit, to the network device, uplink control information comprising the first indication.

In a fourth aspect, there is provided a device. The device comprises at least one processor; and at least one memory including computer program codes; the at least one memory and the computer program codes are configured to, with the at least one processor, cause the device at least to receive, at a network device and from a terminal device, uplink control information comprising a first indication, the first indication indicating spatial components associated with a target coefficient in a matrix comprising a set of non-zero linear combination coefficients for quantizing a channel between the terminal device and the network device, the matrix having the spatial components and frequency components; and determine state information of the channel based on the uplink control information.

In a fifth aspect, there is provided an apparatus comprises means for determining, at a terminal device, a matrix comprising a set of non-zero linear combination coefficients for quantizing a channel between the terminal device and a network device, the matrix having spatial components and frequency components; means for shifting the frequency components of the matrix circularly, such that a target coefficient of the set of non-zero linear combination coefficients is located in a frequency component with a predetermined index of the frequency components in a shifted matrix; means for generating a first indication indicating the spatial component associated with the target coefficient in the matrix; and means for transmitting, to the network device, uplink control information comprising the first indication.

In a sixth aspect, there is provided an apparatus comprising means for receiving, at a network device and from a terminal device, uplink control information comprising a first indication, the first indication indicating spatial components associated with a target coefficient in a matrix comprising a set of non-zero linear combination coefficients for quantizing a channel between the terminal device and the network device, the matrix having the spatial components and frequency components; and means for determining state information of the channel based on the uplink control information.

In a seventh aspect, there is provided a computer readable medium having a computer program stored thereon which, when executed by at least one processor of a device, causes the device to carry out the method according to the first aspect.

In an eighth aspect, there is provided a computer readable medium having a computer program stored thereon which, when executed by at least one processor of a device, causes the device to carry out the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
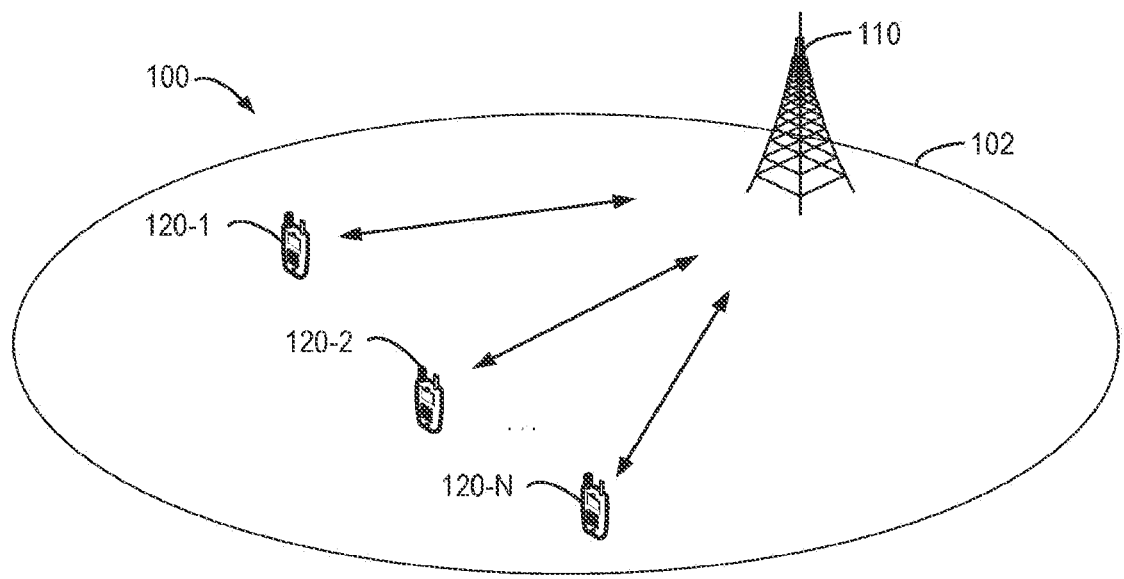
FIG. 1 shows an example communication network in which example embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G NR, and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), eMBB, mMTC and uRLLC technologies. For the purpose of discussion, In some example embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or cNB), a 5G or next generation NodeB (gNB), a Remote Radio Module (RRU), a radio header (RH), a remote radio head (RRH), a low power node such as a femto, a pico, and the like. For the purpose of discussion, in some example embodiments, the gNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Position Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some example embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "location server" may refer to a service function which provides the positioning of the target UE to a location client. The location server may communicate with the target UE to obtain the positioning measurement report from the target UE via a high layer signaling. The location service may also communicate with the network device to obtain information associated with the positioning of the target UE. The location server may be a component independent of the network device. As an option, the location server may be any function module or function entity embedded in the network device.

Corresponding to the term "location server", the term "location client", as used herein, may refer to an application or entity which requests the location of the target UE. The location client may transmit a location request to the location service and receives the positioning of the target UE from the location server. Also, the location client may be considered as the target UE itself.

As used herein, the term "cell" refers to an area covered by radio signals transmitted by a network device. The terminal device within the cell may be served by the network device and access the communication network via the network device.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, the Precoding Matrix Indicator (PMI) is represented by a matrix for each reported layer, each containing as many column vectors as the number of sub-bands. The SD and FD compression operations are applied to these PMI matrices across their rows and columns respectively. As a result, the PMT for a layer is compressed in three component parts: an orthogonal basis set of DFT vectors for SD compression, an orthogonal basis set of DFT vectors for FD compression and a set of complex-valued linear combination (LC) coefficients. Therefore, both compression operations are linear projections on two orthogonal bases. When the two orthogonal bases are reported by indicating a subset from a DFT-based codebook, the LC coefficients are quantized in amplitude and phase by using scalar quantizers. Because only a subset of nonzero LC coefficients can be reported per layer to reduce overhead, both the location of the reported nonzero coefficients and their complex values are required to be reported. A bitmap per layer is used to report these locations.

Each PMI vector can be reported to the BTS based on a complex (amplitude and phase) scaling factor because this factor does not affect the precoder design. This property is used, for example, to apply appropriate phase shifts to the columns of the PMI matrix before FD compression to optimize the compression operation. This property also allows to apply a common scaling to all the LC coefficients before quantization, such that they are upper-bounded in amplitude by 1 and the quantization interval for amplitude becomes [0,1].

This common scaling of LC coefficients is applied independently to the coefficients of each layer and consists in the amplitude and phase of the "strongest" coefficient, i.e., the coefficient with the largest magnitude, for that layer. Since the strongest coefficient after normalization may equal to 1, neither amplitude nor phase for the strongest coefficient arc required to be reported. Instead, its location in the bitmap is signaled by means of a strongest coefficient indicator (SCI).

An important aspect of Channel State Information (CSI) signaling for Multi-User Multiple Input Multiple Output (MU-MIMO) is the arrangement of the components of the compressed PMI in uplink control information (UCI) message. In a conventional way, this message may be organized in two parts, namely "UCI part 1" and "UCI part 2". The "UCI part 1" may comprise the CQI information and the parameters needed to determine the payload size of the "UCI part 2". The "UCI part 1" transmitted in the Physical Uplink Control Channel (PUCCH) may have a very short and fixed-size payload and may be encoded with very strong forward error correction code to guarantee error-free decoding. The "UCI part 2" may comprise the bulk of compressed PMI and be transmitted in the Physical Uplink Shared Channel (PUSCH), hence it has the same error protection as data.

The information in the "UCI part 1" that is used to determine the payload size of "UCI part 2" can be arranged in two manners, namely (1) the number of the nonzero LC coefficients per each layer (the number of the layers equal to the maximum reported rank) and (2) the total number of nonzero LC coefficients for all reported layers and the RI indicator. The both ways allow determining the reported rank and therefore number of bitmaps in the "UCI part 2". The number of the quantized coefficients is also reported in the "UCI part 2", from which the payload size can be determined.

Note that some parameters needed for determining the size of the "UCI part 2" and for correct PMI decoding are not reported in "UCI part 1" because they are configured by the network. These are the parameters controlling the maximum overhead for CSI reporting, i.e., the size of the SD and FD bases and the maximum number of nonzero coefficients.

The manner (2), as mentioned above, is preferable, because the overhead for indicating the number of nonzero LC coefficients in the "UCI part 1" may be significantly reduced. However, the manner (2) has a drawback of making the signaling of the SCI more inefficient. In fact, there is one SCI for each reported layer in part 2, because the normalization of the LC coefficients is done independently per layer. Unless a restriction is introduced in the number of nonzero coefficients per layer, the SCI should contain $[\log_2 N_{NZ}]$ bits, with $N_{NZ}$ total number of nonzero coefficients.

Introducing such a restriction is not desirable either because the UE should select the LC coefficients to be reported to optimize the compression jointly across the reported layers for a given maximum budged of coefficients. Adding unnecessary constraints to this optimization, for example by limiting the number of coefficients allowed to be reported per layer, may have a negative impact in performance.

Thus, the present disclosure proposes a signaling mechanism for the SCIs and the FD bases that reduces the overhead of the UCI message by exploiting a property of DFT-based frequency compression, namely that any phase ramp applied across the columns of the LC coefficient matrix before FD compression is transparent to the BTS and does not require signaling.

Embodiments of the present disclosure provide a solution for UCI design, so as to at least in part solve the above and other potential problems. Some example embodiments of the present disclosure will be described below with reference to the figures. However, those skilled in the art would readily appreciate that the detailed description given herein with respect to these figures is for explanatory purpose as the present disclosure extends beyond theses limited embodiments.

FIG. 1 shows an example communication network 100 in which implementations of the present disclosure can be implemented. The communication network 100 includes a network device 110 and terminal devices 120-1, 120-2 . . . and 120-N, which can be collectively or individually referred to as "terminal device(s)" 120. The network 100 can provide one or more cells 102 to serve the terminal device 120. It is to be understood that the number of network devices, terminal devices and/or cells is given for the purpose of illustration without suggesting any limitations to the present disclosure. The communication network 100 may include any suitable number of network devices, terminal devices and/or cells adapted for implementing implementations of the present disclosure.

In the communication network 100, the network device 110 can communicate data and control information to the terminal device 120 and the terminal device 120 can also communication data and control information to the network device 110. A link from the network device 110 to the terminal device 120 is referred to as a downlink (DL), while a link from the terminal device 120 to the network device 110 is referred to as an uplink (UL).

The communications in the network 100 may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In order to obtain CSI of a communication channel between the network device 110 and the terminal device 120, the network device 110 may transmit a Channel State Information-reference signal (CSI-RS) to the terminal device 120. The terminal device 120 may receive the CSI-RS from the network device 110, and obtain channel information by measuring the CSI-RS. The terminal device 120 may then determine the CSI of the communication channel based on the obtained channel information and a corresponding codebook. For example, the obtained channel information can be quantized into the CSI based on the corresponding codebook. The terminal device 120 may report the CSI to the network device 110. The process for reporting the CSI is also called as "CSI feedback". The CSI may ensure reliability of the wireless communication between the network device 110 and the terminal device 120. As mentioned above, for the CSI signaling, an important aspect is the arrangement of the components of the compressed PMI in uplink control information (UCI) message.

Figure 2:
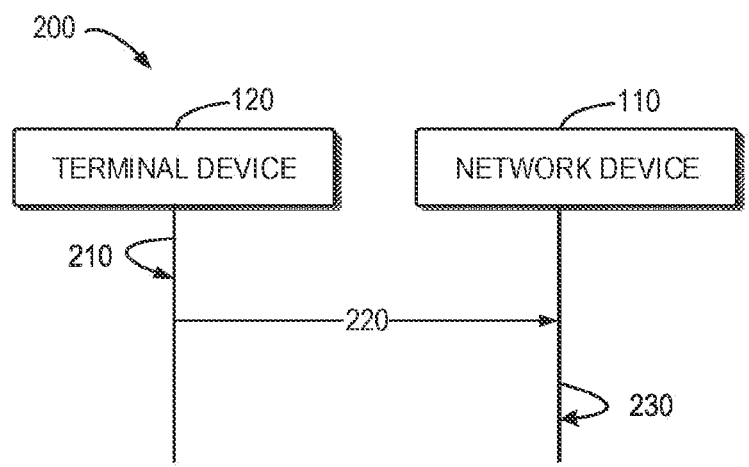
FIG. 2 shows a schematic diagram illustrating a process for UCI design according to example embodiments of the present disclosure.

FIG. 2 shows a schematic diagram of a process 200 for the UCI design according to example embodiments of the present disclosure. For the purpose of discussion, the process 200 will be described with reference to FIG. 1. The process 200 may involve the terminal device 120 and the network devices 110 as illustrated in FIG. 1.

As shown in FIG. 2, the terminal device 120 determines 210 a matrix characterizing a channel between the terminal device 120 and a network device 110. The matrix may have spatial components and frequency components and corresponding to a bitmap indicating a set of non-zero linear combination coefficients for quantizing the channel.

In some example embodiments, the terminal device 120 may receive the downlink control information received from the network device 110 and obtain a resource indication associate with the spatial components and the frequency components, which is known for both terminal device and the network device. The terminal device 120 may determine the matrix based on the downlink control information and the resource indication.

Figures 3A, 3B:
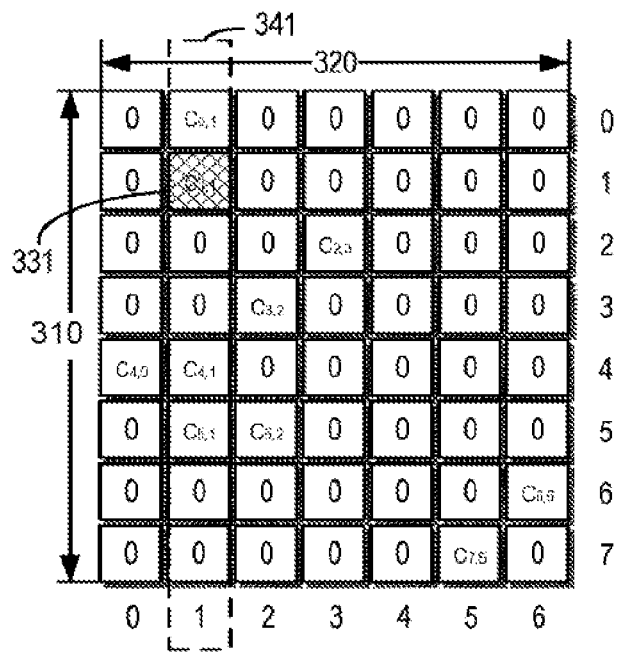
FIGS. 3A and 3B show diagrams of an example matrix and the corresponding bitmap according to some example embodiments of the present disclosure.

Such matrix and the corresponding bitmap may be shown in FIG. 3A and FIG. 3B, respectively. As shown in FIG. 3A, the matrix has spatial components in the spatial domain 310 and frequency components in the frequency domain 320. Such matrix shown in FIG. 3A may be referred to as a LC coefficient matrix.

As mentioned above, the matrix may be obtained by applying the compression to a PMI matrix representing the collection of precoding vectors for a given spatial layer for all the configured sub-bands, which may be indicated in the downlink control information received from the network device 110. Given the PMI matrix W of size $2N_1N_2 \times N_3$, where $N_1 \times N_2$ is the number of antenna ports for each polarization in the transmit two-dimensional cross-polarized antenna array and $N_3$ is the number of configured PMI sub-bands. For rank indicators (RI) larger than one, there is one such PMI matrix for each of the RI spatial layers. The compression operations on PMI matrix W are linear and can be represented by the following equation:

$$W = W_1 \tilde{W}_2 W_f^H \quad (1)$$

where the column vectors of matrix $W_1$ are the components of the SD orthogonal basis of size 2L, the columns of $W_f$ form the FD orthogonal basis of size M, and $\tilde{W}_2$ is a 2L×M matrix of complex-valued LC coefficients. The matrix $\tilde{W}_2$ may refer to the matrix shown in FIG. 3A. To further reduce the signaling overhead, only a subset of the 2LM LC coefficients are reported, and the remaining ones are set to zero. This group of reported LC coefficients are referred to as non-zero (NZ) coefficients. The NZ coefficient may refer to the cells in FIG. 3A which are not equal to zero, for example, cell 331.

Thus, the PMI report for a layer may consists of two indicators for the SD and FD basis subset selection, respectively and a 2L×M bitmap indicating the location of the KNz nonzero coefficients in the $\tilde{W}_2$ matrix. The bitmap corresponding to the $\tilde{W}_2$ matrix may be shown in FIG. 3B. As shown in FIGS. 3A and 3B, the row and column of the bitmap may corresponding to the spatial components and the frequency components, for example, the $0^{th}$ frequency component in the frequency domain 320 corresponds to the $0^{th}$ column of the bitmap.

There is the target coefficient in the $K_N z$ nonzero coefficients in the $\tilde{W}_2$ matrix. The target coefficient may be referred to as the maximum coefficient of the non-zero coefficients, i.e,. the strongest coefficient. In order to reducing the overhead for reporting the indication for strongest coefficient, the terminal device 120 determines shifting operation for the frequency components of the matrix, such that the strongest coefficient is located in a frequency component with a predetermined index.

In some example embodiments, the terminal device 120 may determine indices of the frequency components and perform modulo operation for the frequency components in the matrix based on the indices of the frequency components, the number of the frequency components in a predefined set of frequency components, the predetermined index and a reference index of the frequency component. The reference index may indicate frequency component associated with the target coefficient before shifting. The terminal device 120 may perform the shifting operation based on result of the modulo operation.

For example, let $N_3$ is the number of frequency components, $M<N_3$ the size of the frequency domain basis formed by frequency components with indices $m_0, m_1, m_{M-1}$, and $m_{i_{max}}$ is the index of the frequency component with the strongest coefficient. For example, assuming that the predefined index value for the component $m_{i_{max}}$ is 0. The terminal device 120 may perform the shifting operation based on the following equation:

$$\{m_i\} \rightarrow \{(m_i - m_{i_{max}}) \bmod N_3\} \quad (2)$$

Then, the terminal device 120 determines an indication for the strongest coefficient, i.e., the SCI, based on the spatial components where the strongest coefficient located. The SCI may indicate the spatial component associated with the target coefficient in the matrix.

The terminal device 120 further generates another indication for indicating a frequency range associated with a subset of the frequency components based on the based on the predetermined index and the frequency components. That is, the subset of the frequency components excludes the frequency component with the predetermined index.

In some example embodiments, the terminal device 120 may determine, from the frequency components, a target frequency component associated with the predetermined index and select from the frequency components, the subset of the frequency components excluding the target frequency component. The terminal device 120 may determine the indices of the subset of the frequency components and generate the indication for indicating the frequency range based on the indices of the subset of the frequency component.

Referring back to the assumption related to the equation (2), the terminal device 120 may report the subset of the frequency components of size M−1, without the "$0^{th}$" frequency component as below:

$$(m_{i_{max}+1} - m_{i_{max}}) \bmod N_3, (m_{i_{max}+2} - m_{i_{max}}) \bmod N_3, \ldots, (m_{i_{max}-1} - m_{i_{max}}) \bmod N_3 \quad (3)$$

After determining the SCI and the indication associated with the frequency range, the terminal device 120 may transmit 220 the uplink control information comprising both of the indications to the network device 110.

It should be understood that the UCI may comprise other necessary message for reporting the related parameters for estimating the channel state.

In some example embodiments, the UCI may also comprise a bitmap corresponding to the matrix of the LC coefficient. A bitmap may be determined based on the matrix before the shifting operation. As mentioned above, such bitmap may indicate the locations of the NZ coefficient in the matrix. After the shifting operation of the matrix, the bitmap may also be updated based on the predetermined index.

In some example embodiments, the terminal device 120 may determine a corresponding relationship between the predetermined index and each index of the indices of the frequency components based on the indices of the frequency components and the predetermined index and update the bitmap based on the corresponding relationship.

In some example embodiments, the terminal device 120 transmits the uplink control information also comprising the updated bitmap.

With reference to FIGS. 3A-3B and FIGS. 4A-4B, the shifting operation may be shown clearly. As mention above the matrix of FIG. 3A may have a size of 2L*M, there are a set of NZ coefficients in the matrix and FIG. 3B shows a bitmap corresponding to the matrix of FIG. 3A. As shown in FIG. 3A, assuming the strongest coefficient 330 is located in the $1^{th}$ frequency component 341. For example, the terminal device 120 may shift the matrix such that the strongest coefficient is located in the $0^{th}$ frequency component. The shifted matrix may be shown in FIG. 4A. The strongest coefficient 330 is located in the $0^{th}$ frequency component 340. Correspondingly, the bitmap shown in FIG. 3B may be updated to be the bitmap shown in FIG. 4B.

Figures 4A, 4B:
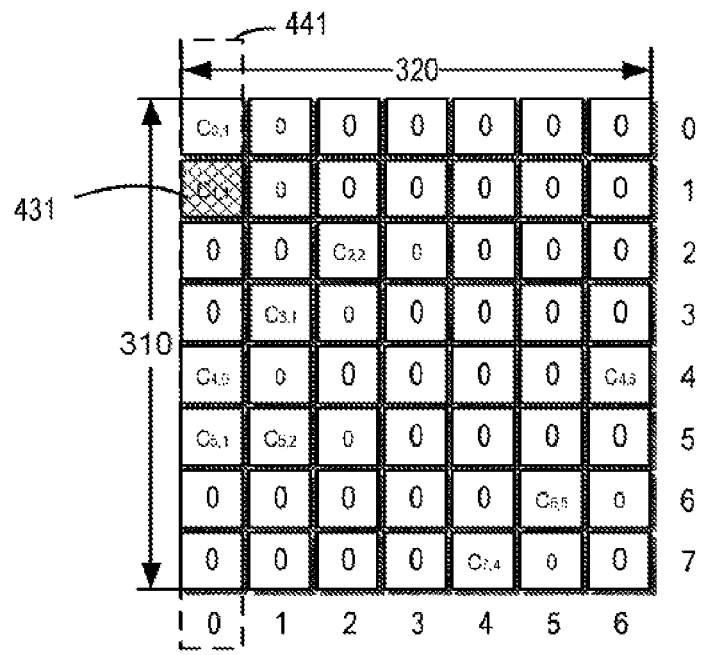
FIGS. 4A and 4B show diagrams of an example matrix and the corresponding bitmap after the shifting operation according to some example embodiments of the present disclosure.

If we assume, without loss of generality, a row-wise reading order of the bitmap in FIG. 4A, the strongest coefficient is the third NZ coefficient, hence, without the proposal of the present disclosure, it would be indicated with $[\log_2 K_{NZ}]=4$ bits: SCI=2 or 0010 (4-bit binary representation of 2). The value $K_{NZ}=10$ for this layer should also be reported in "UCI part 1".

According to the solution of the present disclosure, if the predetermined index is "$0^{th}$", the terminal device 120 may apply the shift operation to the frequency components of one position to the left, in the example of FIG. 3A. For example, let us assume the frequency components are $\{m_0, m_1, \ldots, m_{M-1}\}=\{0,1,3,5,10,11,12\}$ with the index of the FD component with the strongest coefficient given by $m_{i_{max}}=1$. After the circular shift and re-ordering the FD basis subset is given by $\{0,2,4,9,10,11,12\}$. On the other hand, the SCI is indicated with [log₂ 2L]=3 bits reporting the SD component index, which in the example is: SCI=1 or 001 (3-bit binary representation of 1).

Referring FIG. 2 again, the network device 110 receives the uplink control information from the terminal device 120 and determines state information of the channel based on the uplink control information.

In some example embodiments, the network device 110 may determine the matrix based on the uplink control information and determine the state information based on the matrix. As mentioned above, the matrix may be obtained by apply the compression of the PMI matrix. The network device 110 needs to reconstruct the PMI matrix based on the matrix. According to the UCI, the network device 110 may determine the subset of the frequency components excluding the target frequency component and the network device 110 may reconstruct the PMI by adding the target frequency component to the subset of the frequency components.

In this way, a new solution for designing the UCI may reduce the overhead for reporting the parameters in the "UCI part 1" and "UCI part 2".

In the following, the principle for circular shift will be explained. As mentioned above, any circular shift applied to the frequency components is equivalent to a multiplication of the columns of the PMI by a phase ramp before applying frequency compression. Such phase ramp operation performed at the terminal device 120 does not need to be reported to the network device 110 because it is transparent to the precoder design.

It is well known that a phase rotation across the columns of a precoding matrix W does not affect the precoder performance, hence the network device 110 may reconstruct W up to a phase adjustment per column without affecting performance. This is true for any type of precoder design. It will be shown that phase adjustments applied across the columns of matrix $W_2$ before frequency domain compression do not need to be reported to the network device 110. It will also be pointed out that the choice of these phases is an important degree of freedom that a terminal device 120 can exploit to improve frequency compression, i.e., reduce the reconstruction error at the network device 110.

At first, considering an ideal case for frequency compression, without basis subset selection, i.e. assuming that $M=N_3$, and with reporting of all $2LN_3$ unquantized frequency domain coefficients. Note that this is just a hypothetical case as there is no actual compression gain in the frequency domain. Assuming that a terminal device 120 applies phase adjustments on the columns of $W_2$ before the DFT processing across the sub-bands and we indicate with R a diagonal matrix of arbitrary phase rotations:

$$\tilde{W}_2 = W_2 R W_f \quad (4)$$

If the network device 110 knows R, the precoder W is reconstructed as:

$$W(R) = W_1 \tilde{W}_2 (RW_f)^H = W_1 W_2 \quad (5)$$

whereas, if the network device 110 is unaware of R, the reconstruction yields:

$$W = W_1 \tilde{W}_2 W_f^H = W_1 W_2 R \quad (6)$$

In this ideal case, we observe that 1) the difference between the reconstruction (5) and (6) is just a phase rotation across the precoder's columns, i.e.

$$W = W(R)R \quad (7)$$

and 2) assuming perfect reporting of the $2L \times N_3$ linear combination matrix $W_2$, applying the phase rotations in (4) is irrelevant.

Considering the realistic case of basis subset selection with $M \le N_3$ and quantization of the linear combination coefficients and say $\tilde{W}'_2$ is the $2L \times N_3$ matrix of FD coefficients known at the network device 110. Note that only up to $K_0$ coefficients of $\tilde{W}'_2$ are nonzero. Quantisation error also affects the nonzero coefficients. Introducing the error matrix between the realistic and ideal matrix of linear combination coefficients:

$$E = \tilde{W}'_2 - \tilde{W}_2 \quad (8)$$

Such that $\tilde{W}'_2$ can be expressed, in a very general case, as:

$$\tilde{W}'_2 = \tilde{W}_2 + E = W_2 R W_f + E \quad (9)$$

If the network device 110 knows the phase shifts R, the precoder W' is reconstructed, with error, as:

$$W'(R) = W_1 \tilde{W}'_2 (RW_f + E) W_f^H R^H = W_1 W_2 + W_1 E W_f^H R^H \quad (10)$$

If the network device 110 is unaware of R, the precoder reconstruction yields:

$$W' = W_1 \tilde{W}'_2 W_f^H W_1 (RW_f)^H = W_1 (W_2 RW_f + E)$$
$$W_f^H = W_1 W_2 R + W_1 E W_f^H \quad (11)$$

By comparing (10) and (11), it will have:

$$W' = W'(R)R \quad (12)$$

i.e., the difference between the two reconstructions, with and without reporting of R, is a phase rotation applied to the precoder's columns, which does not affect the precoder's performance. However, unlike in the ideal case, applying appropriate phase rotations at the terminal device does make a difference in terms of reconstruction error. In fact, the terminal device may optimize the selection of the phase rotations R such that the reconstruction error E is minimized according to some metric, even if the network device is unaware of these phase adjustments.

Note that both results (7) and (12) hold when $W_f$ is $2L \times M$, instead of $2L \times N_3$, but the expressions for W' and W'(R) are more complicated because $W_f W_f^H$ is no longer the identity matrix.

In conclusion, when applying frequency domain compression, optimization of the phase adjustments R can be used by the terminal device to improve the PMI accuracy. However, these adjustments do not need to be communicated to the network device to achieve this gain.

Note that several operations can be expressed by these phase rotations. An oversampled DFT codebook can be described as the union of $O_3$ circularly shifted versions of a critically sampled codebook, where the minimum shift is fractional. Accordingly, we can express the selection of one of the $O_3$ orthogonal groups of size $N_3$ by using notation (3) with R given by the phase ramp:

$$R_o = \begin{pmatrix} 1 & 0 & 0 & 0 & 0 \\ 0 & e^{j2\pi \frac{k}{O_3 N_3}} & 0 & 0 & 0 \\ 0 & 0 & e^{j2\pi \frac{2k}{O_3 N_3}} & 0 & 0 \\ 0 & 0 & 0 & \ddots & 0 \\ 0 & 0 & 0 & 0 & e^{j2\pi \frac{(N_3-1)k}{O_3 N_3}} \end{pmatrix} \quad (13)$$

and $k \in [0, \ldots, O_3-1]$. Similarly, a circular shift of the $N_3$ frequency domain candidate components can be obtained by applying a phase ramp across the columns of $W_2$, in the original domain, with minimum shift multiple of $O_3$. For example, a circular shift that moves FD component of index n to position '0' can be expressed by (4) with R given by the phase ramp:

$$R_s = \begin{pmatrix} 1 & 0 & 0 & 0 & 0 \\ 0 & e^{j2\pi\frac{n}{N_3}} & 0 & 0 & 0 \\ 0 & 0 & e^{j2\pi\frac{2n}{N_3}} & 0 & 0 \\ 0 & 0 & 0 & \ddots & 0 \\ 0 & 0 & 0 & 0 & e^{j2\pi\frac{(N_3-1)n}{N_3}} \end{pmatrix} \quad (14)$$

and $n \in [0, \ldots, N_3-1]$. Finally, oversampling and circular shifts can also be combined with phase adjustments on the columns of $W_2$ to ensure smooth phase transitions along its rows before applying frequency domain compression and avoid 'phase jumps'. Denoting the diagonal matrix of these phase adjustments as $R_\phi$:

$$R_\phi = \begin{pmatrix} e^{j\phi_0} & 0 & 0 & 0 & 0 \\ 0 & e^{j\phi_1} & 0 & 0 & 0 \\ 0 & 0 & e^{j\phi_2} & 0 & 0 \\ 0 & 0 & 0 & \ddots & 0 \\ 0 & 0 & 0 & 0 & e^{j\phi_{N_3-1}} \end{pmatrix} \quad (15)$$

with $\phi_n \in [0, 2\pi]$. In general, a terminal device can apply a combination of these three operations (oversampling, circular shifts, phase adjustments) by performing a set of phase rotations on the columns of $W_2$, as described in (4), with a rotation matrix given by:

$$R = R_o R_s R_\phi = \begin{pmatrix} e^{j\phi_0} & 0 & 0 & 0 & 0 \\ 0 & e^{j\left(2\pi\frac{O_3 n + k}{O_3 N_3} + \phi_1\right)} & 0 & 0 & 0 \\ 0 & 0 & e^{j\left(2\pi\frac{2(O_3 n + k)}{O_3 N_3} + \phi_2\right)} & 0 & 0 \\ 0 & 0 & 0 & \ddots & 0 \\ 0 & 0 & 0 & 0 & e^{j\left(2\pi\frac{(N_3-1)(O_3 n + k)}{O_3 N_3} + \phi_{N_3-1}\right)} \end{pmatrix} \quad (16)$$

More details of the example embodiments in accordance with the present disclosure will be described with reference to FIGS. 5-6.

Figure 5:
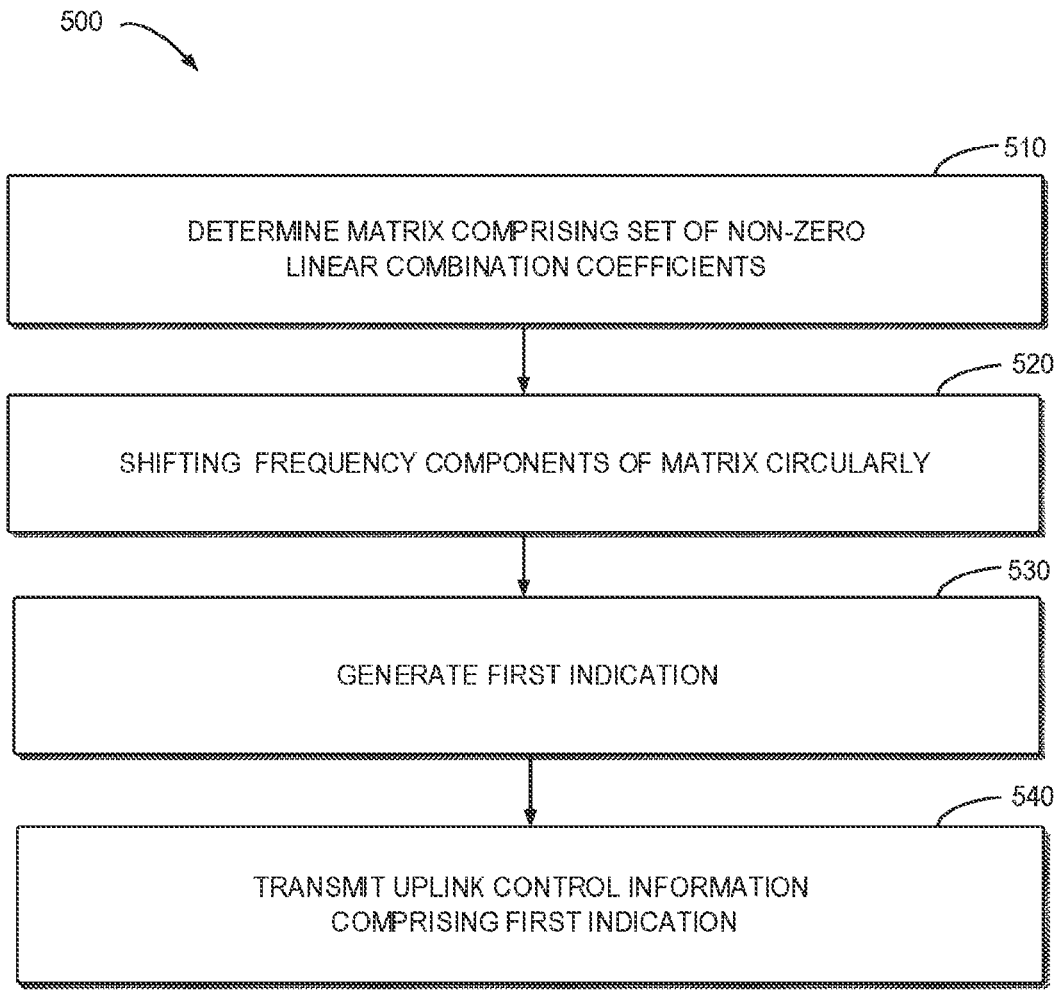
FIG. 5 shows a flowchart of an example method 500 of UCI design according to some example embodiments of the present disclosure.
Figure 6:
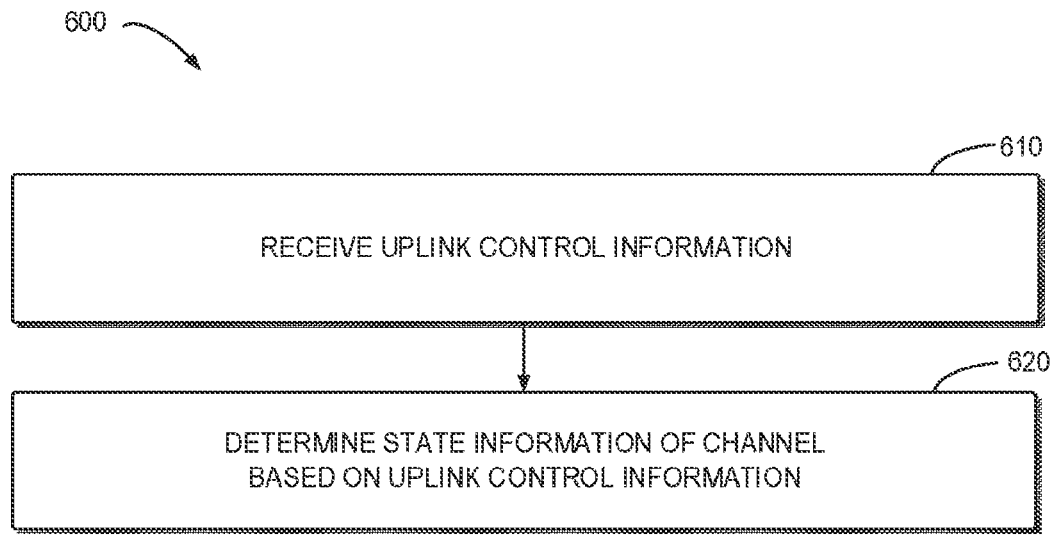
FIG. 6 shows a flowchart of an example method 600 of UCI design according to some example embodiments of the present disclosure.

FIG. 5 shows a flowchart of an example method 500 for UCI design according to some example embodiments of the present disclosure. The method 500 can be implemented at the terminal device 120 as shown in FIG. 1. For the purpose of discussion, the method 500 will be described with reference to FIG. 1.

At 510, the terminal device 110 determines a matrix comprising a set of non-zero linear combination coefficients for quantizing a channel between the terminal device and a network device, the matrix having spatial components and frequency components.

In some example embodiments, the terminal device 110 may receive downlink control information received from the network device and obtain a resource indication associate with the spatial components and the frequency components. The terminal device 110 may also determine the matrix based on the downlink control information and the resource indication.

At 520, the terminal device 110 shifts the frequency components of the matrix circularly, such that a target coefficient of the set of non-zero linear combination coefficients is located in a frequency component with a predetermined index of the frequency components in a shifted matrix.

In some example embodiments, the terminal device 110 may determine indices of the frequency components. The terminal device 110 may also determine a reference index from the indices of the frequency components, the reference index indicating a frequency component associated with the target coefficient in the matrix and shift the frequency components based on the indices of the frequency components, the predetermined index and the reference index.

At 530, the terminal device 110 generates a first indication indicating the spatial component associated with the target coefficient in the matrix.

In some example embodiments, the terminal device 110 may determine, as the target coefficient, a maximum coefficient from the set of non-zero linear combination coefficients and generate the first indication based on the index of the spatial component associated with the target coefficient in the matrix.

At 540, the terminal device 110 transmits, to the network device 120, uplink control information comprising the first indication.

In some example embodiments, the terminal device 110 may determine, based on the shifted matrix, a bitmap indicating locations of the non-zero linear combination coefficients in the shifted matrix; and transmit the uplink control information comprising the bitmap.

In some example embodiments, the terminal device 110 may generate, based on the predetermined index and the frequency components, a second indication indicating a frequency range associated with a subset of the frequency components and transmit the uplink control information comprising the second indication.

In some example embodiments, the terminal device 110 may determine, from the frequency components, a target frequency component associated with the predetermined index and select, from the frequency components, the subset of the frequency components excluding the target frequency component. The terminal device 110 may also determine indices of the subset of the frequency components after the shifting and generate the second indication based on the indices of the subset of the frequency component FIG. 6 shows a flowchart of an example method 600 for UCI design according to some example embodiments of the present disclosure. The method 600 can be implemented at the network device 110 as shown in FIG. 1. For the purpose of discussion, the method 600 will be described with reference to FIG. 1.

At 610, the network device 110 receives at a network device and from a ten final device 120, uplink control information comprising a first indication, the first indication indicating spatial components associated with a target coefficient in a matrix comprising a set of non-zero linear combination coefficients for quantizing a channel between the terminal device and the network device, the matrix having the spatial components and frequency components.

At 620, the network device 110 determines state information of the channel based on the uplink control information.

In some example embodiments, the network device 110 may determine the matrix based on the uplink control information and determine the state information based on the matrix.

In some example embodiments, the network device 110 may receive uplink control information comprising the uplink control information comprising the bitmap indicating locations of the non-zero linear combination coefficients in a shifted matrix obtained by shifting the frequency components of the matrix circularly.

In some example embodiments, the network device 110 may receive uplink control information comprising the second indication indicating a frequency range associated with a subset of the frequency components.

In some example embodiments, an apparatus capable of performing the method 500 (for example, implemented at the terminal device 110) may comprise means for performing the respective steps of the method 500. The means may be implemented in any suitable form. For example, the means may be implemented in a circuitry or software module.

In some example embodiments, the apparatus comprises means for determining, at a terminal device, a matrix comprising a set of non-zero linear combination coefficients for quantizing a channel between the terminal device and a network device, the matrix having spatial components and frequency components; means for shifting the frequency components of the matrix circularly, such that a target coefficient of the set of non-zero linear combination coefficients is located in a frequency component with a predetermined index of the frequency components in a shifted matrix; means for generating a first indication indicating the spatial component associated with the target coefficient in the matrix; and means for transmitting, to the network device, uplink control information comprising the first indication.

In some example embodiments, an apparatus capable of performing the method 600 (for example, implemented at the network device 120) may comprise means for performing the respective steps of the method 600. The means may be implemented in any suitable form. For example, the means may be implemented in a circuitry or software module.

In some example embodiments, the apparatus comprises means for receiving, at a network device and from a terminal device, uplink control information comprising a first indication, the first indication indicating spatial components associated with a target coefficient in a matrix comprising a set of non-zero linear combination coefficients for quantizing a channel between the terminal device and the network device, the matrix having the spatial components and frequency components and means for determining state information of the channel based on the uplink control information.

Figure 7:
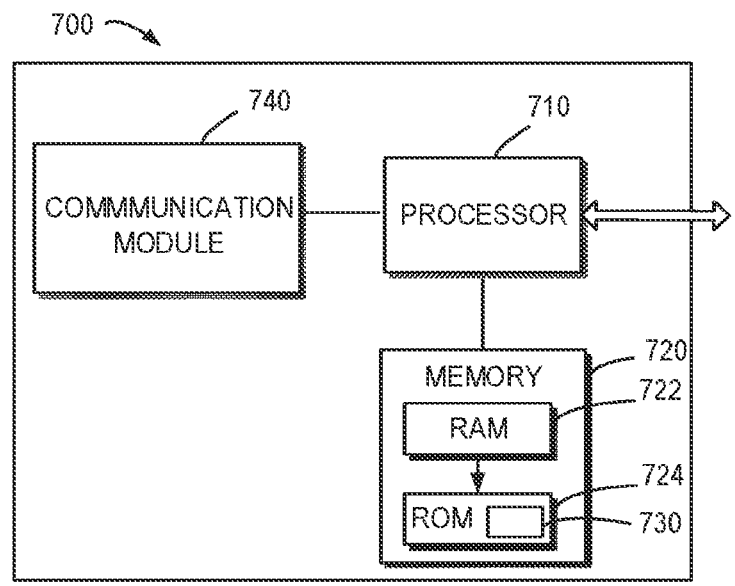
FIG. 7 is a simplified block diagram of a device that is suitable for implementing example embodiments of the present disclosure.

FIG. 7 is a simplified block diagram of a device 700 that is suitable for implementing embodiments of the present disclosure. The device 700 may be provided to implement the communication device, for example the terminal device 120 and the network device 110 as shown in FIG. 1. As shown, the device 700 includes one or more processors 710, one or more memories 740 coupled to the processor 710, and one or more transmitters and/or receivers (TX/RX) 740 coupled to the processor 710.

The TX/RX 740 is for bidirectional communications. The TX/RX 740 has at least one antenna to facilitate communication. The communication interface may represent any interface that is necessary for communication with other network elements.

The processor 710 may be of any type suitable to the local technical network and may include one or more of the following: general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may include one or more non-volatile memories and one or more volatile memories. Examples of the non-volatile memories include, but are not limited to, a Read Only Memory (ROM) 724, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 722 and other volatile memories that will not last in the power-down duration.

A computer program 730 includes computer executable instructions that are executed by the associated processor 710. The program 730 may be stored in the ROM 724. The processor 710 may perform any suitable actions and processing by loading the program 730 into the RAM 720.

The embodiments of the present disclosure may be implemented by means of the program 730 so that the device 700 may perform any process of the disclosure as discussed with reference to FIGS. 2 to 4. The embodiments of the present disclosure may also be implemented by hardware or by a combination of software and hardware.

Figure 8:
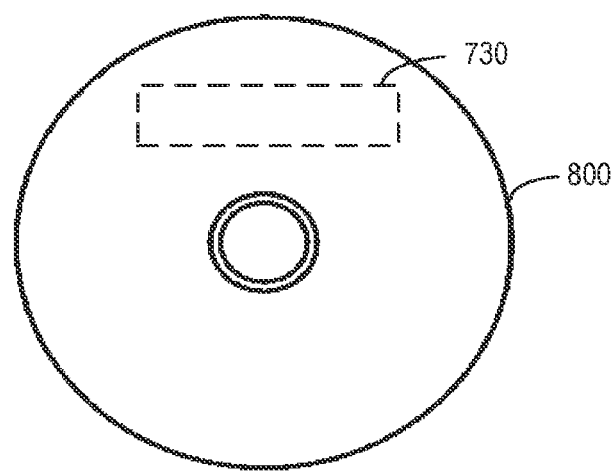
FIG. 8 illustrates a block diagram of an example computer readable medium in accordance with some embodiments of the present disclosure.

In some embodiments, the program 730 may be tangibly contained in a computer readable medium which may be included in the device 700 (such as in the memory 720) or other storage devices that are accessible by the device 700. The device 700 may load the program 730 from the computer readable medium to the RAM 722 for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 500 and 600 as described above with reference to FIGS. 2-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

The invention claimed is:

1. A method comprising:
   determining, at a terminal device, a matrix $\tilde{W}_2$ comprising linear combination coefficients for a pre-coder matrix indicator (PMI) matrix, wherein:
   the PMI matrix is represented by $W = W_1 \tilde{W}_2 W_f^H$,
   matrix $W_1$ is a matrix of size $2N_1N_2 \times 2L$ and represents components of a spatial domain orthogonal basis of size 2L,
   matrix $W_f$ is a matrix of size $N_3 \times M$ and represents components of a frequency domain orthogonal basis of size M,
   matrix $\tilde{W}_2$ is a matrix of size $2L \times M$ and has rows corresponding to spatial components and columns corresponding to frequency components,
   $N_1 \times N_2$ is the number of antenna ports,
   $N_3$ is the number of configured PMI sub-bands, and
   M is less than $N_3$;
   determining a shifted matrix by shifting the frequency components of matrix $\tilde{W}_2$ circularly, such that a maximum coefficient of matrix $\tilde{W}_2$ is located in a frequency component with a predetermined index;
   generating a strongest coefficient indicator with $[\log_2 2L]$ bits, based on the index of the spatial component associated with the maximum coefficient of matrix $\tilde{W}_2$; and
   transmitting, to a network device, uplink control information comprising the strongest coefficient indicator and values of non-zero coefficients of the shifted matrix, wherein the non-zero coefficients exclude the maximum coefficient.

2. The method of claim 1, wherein the determining the matrix $\tilde{W}_2$ further comprises:
   receiving downlink control information from the network device;
   obtaining a resource indication associated with the spatial components and the frequency components; and
   determining the matrix $\tilde{W}_2$ based on the downlink control information and the resource indication.

3. The method of claim 1, wherein the shifting the frequency components further comprises:
   determining indices of the frequency components;
   determining a reference index from the indices of the frequency components, the reference index indicating a frequency component associated with the maximum coefficient in the matrix $\tilde{W}_2$; and
   shifting the frequency components based on the indices of the frequency components, the predetermined index, and the reference index.

4. The method of claim 1, further comprising:
   determining, based on the shifted matrix, a bitmap indicating locations of the non-zero linear combination coefficients in the shifted matrix; and
   transmitting the uplink control information comprising the bitmap.

5. The method of claim 1, further comprising:
   generating, based on the predetermined index and the frequency components, a second indication indicating a frequency range associated with a subset of the frequency components; and
   transmitting the uplink control information comprising the second indication.

6. The method of claim 5, wherein generating the second indication further comprises:

determining, based at least on the frequency components, a maximum frequency component associated with the predetermined index;

selecting, from the frequency components, the subset of the frequency components excluding the maximum frequency component;

determining indices of the subset of the frequency components after the shifting; and generating the second indication based on the indices of the subset of the frequency component.

7. A method comprising:

transmitting, by a network device, to a terminal device, a channel state information reference signal for the terminal device to measure channel state information;

receiving, at the network device, from the terminal device, uplink control information comprising a strongest coefficient indicator and locations and values of non-zero coefficients of a matrix $\tilde{W}_2$ for a pre-coder matrix indicator (PMI) matrix, wherein:

the PMI matrix is represented by $W = W_1 \tilde{W}_2 W_f^H$, matrix $W_1$ is a matrix of size $2N_1N_2 \times 2L$ and represents components of a spatial domain orthogonal basis of size 2L, matrix $W_f$ is a matrix of size $N_3 \times M$ and represents components of a frequency domain orthogonal basis of size M, matrix $\tilde{W}_2$ is a matrix of size $2L \times M$ and has rows corresponding to spatial components and columns corresponding to frequency components, $N_1 \times N_2$ is the number of antenna ports, $N_3$ is the number of configured PMI sub-bands, M is less than $N_3$, the non-zero coefficients received from the terminal device exclude a maximum coefficient, and a received strongest coefficient indicator with $[\log_2 2L]$ bits is based on the index of a spatial component associated with a maximum coefficient of the matrix $\tilde{W}_2$; and determining, based at least on the uplink control information received from the terminal device, state information of the channel, wherein a coefficient of the matrix $\tilde{W}_2$, at a position with the spatial component indicated by the strongest coefficient indicator and with a frequency component determined by a predetermined index, assumes a preconfigured value obtained by applying a common scaling to the coefficients of the matrix $\tilde{W}_2$.

8. The method of claim 7, wherein determining the matrix $\tilde{W}_2$ further comprises:

determining the matrix $\tilde{W}_2$ based on the uplink control information; and determining the state information based on at least the matrix $\tilde{W}_2$.

9. The method of claim 7, wherein the uplink control information comprises a second indication indicating a frequency range associated with a subset of the frequency components.

10. The method of claim 7, wherein the preconfigured value is 1.

11. A terminal device comprising:

at least one processor; and at least one memory storing instructions thereon that, when executed by the at least one processor, cause the terminal device to perform at least:

determining a matrix $\tilde{W}_2$ comprising linear combination coefficients for a pre-coder matrix indicator (PMI) matrix, wherein:

the PMI matrix is represented by $W = W_1 \tilde{W}_2 W_f^H$, matrix $W_1$ is a matrix of size $2N_1N_2 \times 2L$ and represents components of a spatial domain orthogonal basis of size 2L, matrix $W_f$ is a matrix of size $N_3 \times M$ and represents components of a frequency domain orthogonal basis of size M, matrix $\tilde{W}_2$ is a matrix of size $2L \times M$ and has rows corresponding to spatial components and columns corresponding to frequency components, $N_1 \times N_2$ is the number of antenna ports, $N_3$ is the number of configured PMI sub-bands, and M is less than $N_3$;

determining a shifted matrix by shifting the frequency components of matrix $\tilde{W}_2$ circularly, such that a maximum coefficient of matrix $\tilde{W}_2$ is located in a frequency component with a predetermined index;

generating a strongest coefficient indicator with $[\log_2 2L]$ bits, based on the index of the spatial component associated with the maximum coefficient of matrix $\tilde{W}_2$; and transmitting, to a network device, uplink control information comprising the strongest coefficient indicator and values of non-zero coefficients of the shifted matrix, wherein the non-zero coefficients exclude the maximum coefficient.

12. The terminal device of claim 11, wherein the instructions stored on the at least one memory, when executed by the at least one processor, cause the terminal device to perform the determining the matrix $\tilde{W}_2$ by causing the terminal device to perform at least:

receiving downlink control information received from the network device;

obtaining a resource indication associated with the spatial components and the frequency components; and determining the matrix $\tilde{W}_2$ based on the downlink control information and the resource indication.

13. The terminal device of claim 11, wherein the instructions stored on the at least one memory, when executed by the at least one processor, cause the terminal device to perform the shifting the frequency components by causing the terminal device to perform at least:

determining indices of the frequency components;

determining a reference index from the indices of the frequency components, the reference index indicating a frequency component associated with the maximum coefficient in the matrix $\tilde{W}_2$; and shifting the frequency components based on the indices of the frequency components, the predetermined index and the reference index.

14. The terminal device of claim 11, wherein the instructions stored on the at least one memory, when executed by the at least one processor, further cause the terminal device to perform:

determining, based on the shifted matrix, a bitmap indicating locations of the non-zero linear combination coefficients in the shifted matrix; and transmitting the uplink control information comprising the bitmap.

15. The terminal device of claim 11, wherein the instructions stored on the at least one memory, when executed by the at least one processor, further cause the terminal device to perform:

generating, based on the predetermined index and the frequency components, a second indication indicating a frequency range associated with a subset of the frequency components; and transmitting the uplink control information comprising the second indication.

16. The terminal device of claim 15, wherein the instructions stored on the at least one memory, when executed by the at least one processor, cause the terminal device to perform the generating the second indication by causing the terminal device to perform at least:
   determining, from the frequency components, a maximum frequency component associated with the predetermined index;
   selecting, from the frequency components, the subset of the frequency components excluding the maximum frequency component;
   determining indices of the subset of the frequency components after the shifting; and
   generating the second indication based on the indices of the subset of the frequency component.

17. A network device comprising:
   at least one processor; and
   at least one memory comrising instructions stored thereon that, when executed by the at least one processor, cause the network device to perform at least:
   transmitting, to a terminal device, a channel state information reference signal for the terminal device to measure channel state information;
      receiving, from the terminal device, uplink control information comprising a strongest coefficient indicator and locations and values of non-zero coefficients of a matrix $\tilde{W}_2$ for a pre-coder matrix indicator (PMI) matrix, wherein:
         the PMI matrix is represented by $W = W_1 \tilde{W}_2 W_f^H$,
         matrix $W_1$ is a matrix of size $2N_1N_2 \times 2L$ and represents components of a spatial domain orthogonal basis of size 2L,
         matrix $W_f$ is a matrix of size $N_3 \times M$ and represents components of a frequency domain orthogonal basis of size M,
         matrix $\tilde{W}_2$ is a matrix of size $2L \times M$ and has rows corresponding to spatial components and columns corresponding to frequency components,
         $N_1 \times N_2$ is the number of antenna ports,
         $N_3$ is the number of configured PMI sub-bands,
         M is less than $N_3$,
         the non-zero coefficients received from the terminal device exclude a maximum coefficient, and
         a received strongest coefficient indicator with $[\log_2 2L]$ bits is based on the index of a spatial component associated with a maximum coefficient of the matrix $\tilde{W}_2$; and
      determining, based at least on the uplink control information received from the terminal device, state information of the channel, wherein a coefficient of the matrix $\tilde{W}_2$, at a position with the spatial component indicated by the strongest coefficient indicator and with a frequency component determined by a predetermined index, assumes a preconfigured value obtained by applying a common scaling to the coefficients of the matrix $\tilde{W}_2$.

18. The network device of claim 17, wherein the instructions stored on the at least one memory, when executed by the at least one processor, cause the network device to perform the determining the matrix $\tilde{W}_2$ by causing the network device to perform at least:
   determining the matrix $\tilde{W}_2$ based on the uplink control information; and
   determining the state information based on at least the matrix $\tilde{W}_2$.

19. The network device of claim 17, wherein the uplink control information comprises a second indication indicating a frequency range associated with a subset of the frequency components.

20. The network device of claim 17, wherein the preconfigured value is 1.

21. A non-transitory computer-readable storage medium comprising program instructions stored therein that, when executed by at least one processor of a terminal device, cause the terminal device to perform at least:
   determining a matrix W 2 comprising linear combination coefficients for a pre-coder matrix indicator (PMI) matrix, wherein:
      the PMI matrix is represented by $W = W_1 \tilde{W}_2 W_f^H$,
      matrix $W_1$ is a matrix of size $2N_1N_2 \times 2L$ and represents components of a spatial domain orthogonal basis of size 2L,
      matrix $W_f$ is a matrix of size $N_3 \times M$ and represents components of a frequency domain orthogonal basis of size M,
      matrix $\tilde{W}_2$ is a matrix of size $2L \times M$ and has rows corresponding to spatial components and columns corresponding to frequency components,
      $N_1 \times N_2$ is the number of antenna ports,
      $N_3$ is the number of configured PMI sub-bands, and
      M is less than $N_3$;
   determining a shifted matrix by shifting the frequency components of matrix $\tilde{W}_2$ circularly, such that a maximum coefficient of matrix $\tilde{W}_2$ is located in a frequency component with a predetermined index;
   generating a strongest coefficient indicator with $[\log_2 2L]$ bits, based on the index of the spatial component associated with the maximum coefficient of matrix $\tilde{W}_2$; and
   transmitting, to a network device, uplink control information comprising the strongest coefficient indicator and values of non-zero coefficients of the shifted matrix, wherein the non-zero coefficients exclude the maximum coefficient.

22. The non-transitory computer-readable storage medium of claim 21, wherein determining the matrix $\tilde{W}_2$ further comprises:
   receiving downlink control information received from the network device;
   obtaining a resource indication associated with the spatial components and the frequency components; and
   determining the matrix $\tilde{W}_2$ based on the downlink control information and the resource indication.

23. The non-transitory computer-readable storage medium of claim 21, wherein the shifting the frequency components further comprises:
   determining indices of the frequency components;
   determining a reference index from the indices of the frequency components, the reference index indicating a frequency component associated with the maximum coefficient in the matrix $\tilde{W}_2$; and
   shifting the frequency components based on the indices of the frequency components, the predetermined index and the reference index.

24. The non-transitory computer-readable storage medium of claim 21, wherein the program instructions further cause the terminal device to perform:
   determining, based on the shifted matrix, a bitmap indicating locations of the non-zero linear combination coefficients in the shifted matrix; and
   transmitting the uplink control information comprising the bitmap.

25. The non-transitory computer-readable storage medium of claim 21, wherein the program instructions further cause the terminal device to perform:
  generating, based on the predetermined index and the frequency components, a second indication indicating a frequency range associated with a subset of the frequency components; and
  transmitting the uplink control information comprising the second indication.

26. The non-transitory computer-readable storage medium of claim 25, wherein generating the second indication further comprises:
  determining, from the frequency components, a maximum frequency component associated with the predetermined index;
  selecting, from the frequency components, the subset of the frequency components excluding the maximum frequency component;
  determining indices of the subset of the frequency components after the shifting; and
  generating the second indication based on the indices of the subset of the frequency component.

27. A non-transitory computer-readable storage medium comprising program instructions stored therein that, when executed by at least one processor of a network device, cause the network device to perform at least:
  transmitting, by a network device, to a terminal device, a channel state information reference signal for the terminal device to measure channel state information;
  receiving, from the terminal device, uplink control information comprising a strongest coefficient indicator and locations and values of non-zero coefficients of a matrix $\tilde{W}_2$ for a pre-coder matrix indicator (PMI) matrix, wherein:
    the PMI matrix is represented by $W = W_1 \tilde{W}_2 W_f^H$,
    matrix $W_1$ is a matrix of size $2N_1N_2 \times 2L$ and represents components of a spatial domain orthogonal basis of size $2L$,
    matrix $W_f$ is a matrix of size $N_3 \times M$ and represents components of a frequency domain orthogonal basis of size M,
    matrix $\tilde{W}_2$ is a matrix of size $2L \times M$ and has rows corresponding to spatial components and columns corresponding to frequency components,
    $N_1 \times N_2$ is the number of antenna ports,
    $N_3$ is the number of configured PMI sub-bands,
    M is less than $N_3$,
    the received non-zero coefficients exclude a maximum coefficient, and
    a received strongest coefficient indicator with $[\log_2 2L]$ bits is based on the index of a spatial component associated with a maximum coefficient of the matrix $\tilde{W}_2$; and
  determining, based at least on the uplink control information received from the terminal device, state information of the channel, wherein a coefficient of the matrix $\tilde{W}_2$, at a position with the spatial component indicated by the strongest coefficient indicator and with a frequency component determined by a predetermined index, assumes a preconfigured value obtained by applying a common scaling to the coefficients of the matrix $\tilde{W}_2$.

28. The non-transitory computer-readable storage medium of claim 27, wherein determining the matrix $\tilde{W}_2$ further comprises:
  determining the matrix $\tilde{W}_2$ based on the uplink control information; and
  determining the state information based on at least the matrix $\tilde{W}_2$.

29. The non-transitory computer-readable storage medium of claim 27, wherein the uplink control information comprises a second indication indicating a frequency range associated with a subset of the frequency components.

30. The non-transitory computer-readable storage medium of claim 27, wherein the preconfigured value is 1.

* * * * *